UNITED STATES PATENT OFFICE.

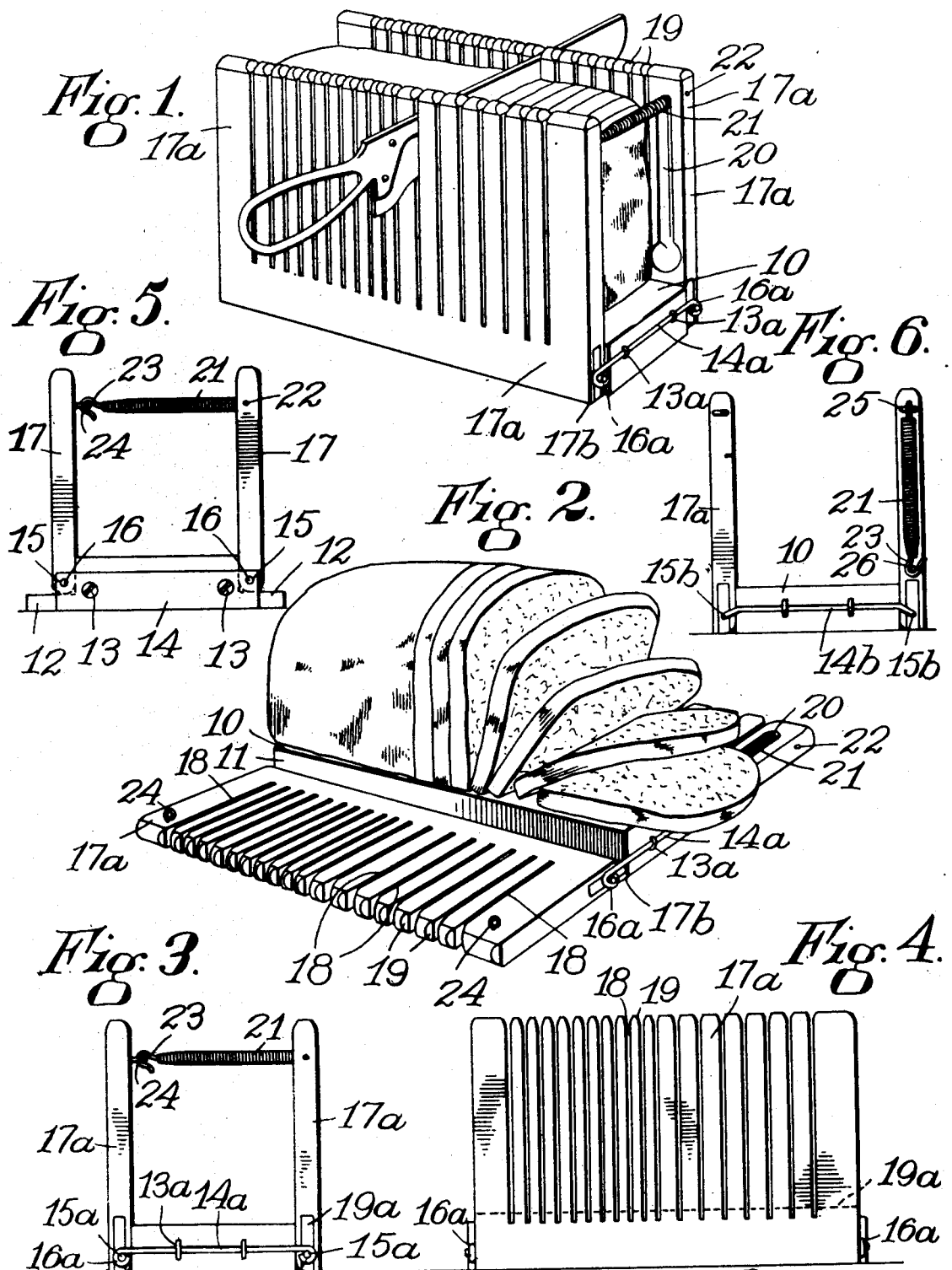
F. H. HAMBLIN.
BREAD SLICER.
APPLICATION FILED JAN. 26, 1912.
1,072,450.
Patented Sept. 9, 1913.
Inventor
Frank H Hamblin.
By Attorneys
Southgate & Southgate.
Witnesses

FRANK H. HAMBLIN, OF WORCESTER, MASSACHUSETTS.

BREAD-SLICER.

1,072,450.  Specification of Letters Patent.  Patented Sept. 9, 1913.

Application filed January 26, 1912. Serial No. 673,522.

*To all whom it may concern:*

Be it known that I, FRANK H. HAMBLIN, a citizen of the United States, residing at Worcester, in the county of Worcester and State of Massachusetts, have invented a new and useful Bread-Slicer, of which the following is a specification.

This invention relates to a device for holding a loaf of bread and guiding a knife so that it can be cut up into uniform slices with very little difficulty.

The principal objects of the invention are to provide a construction of this character in which the bread will be yieldingly held by the knife guides while it is on the bread-board; in which the knife guides can be swung down to horizontal position, leaving the bread exposed after being cut; and in which the construction shall be simple and inexpensive, and the parts readily replaceable, and to provide a simple and inexpensive pivoting and holding device for the guides capable of permitting ready detachment thereof.

Further objects and advantages of the invention will appear hereinafter.

Reference is to be had to the accompanying drawings, in which—

Figure 1 is a perspective view of a bread board and knife guide constructed in accordance with this invention showing a loaf of bread held thereby and being sliced; Fig. 2 is a similar perspective view showing the knife guides spread out flat to expose the loaf of bread; Fig. 3 is an end view; Fig. 4 is a side view, and Figs. 5 and 6 are end views of modifications.

The invention is shown in a simple form in which a bread board 10 is provided having an upper surface of substantially the length and width of an ordinary loaf of bread for receiving such a loaf. It is provided with downwardly extending vertical side walls 11 which are continuous in the preferred form but in the form shown in Fig. 5, at the bottom of these side walls are a pair of outwardly projecting horizontal flanges 12.

On the ends of the bread board in Fig. 5 are removably attached, as by screws 13, a pair of metal plates 14. These plates extend just beyond the vertical side edges of the bread board and above the flanges 12. In this angle they are provided with perforations 15. In these perforations are pivotally mounted a pair of studs 16 on each of a pair of knife guides 17. These studs are oppositely located and obviously they result in pivotally connecting the knife guide with the bread board, and the flanges serve to limit the outward motion of the guides to the horizontal. In the first four figures this is accomplished by providing the bottom of each knife guide 17ᵃ with a square corner 17ᵇ. Each of these knife guides 17ᵃ is provided with parallel slits 18 and the latter at the top are chamfered to form surfaces 19 for guiding the knife accurately into the slits. The slits are at two different distances apart so that slices of two different thicknesses can be cut. The slits extend nearly to the bottom edge of the guide and in order to strengthen the latter at the ends of the slits to prevent splitting and warping a longitudinal strip of wood 19ᵃ is mortised in with its longitudinal grain transverse to the grain of the guide. Preferably it extends to the top of the board 10 and to the lower ends of the slits so as to receive the edge of the cutting knife and prevent slitting of the guides and the notching of the board 10. The knife guides are pivoted in this case by wires or clips 14ᵃ secured to the end of the board by staples 13ᵃ. Their ends are provided with eyes 16ᵃ for receiving pivot studs 15ᵃ on the guides. The wires can be flexed away from the guides to permit removal for cleaning or for replacement with another having different spaces between the slits.

In Fig. 6 a simple pivoting device is shown comprising a wire 14ᵇ having transverse ends at 15ᵇ extending into holes in the guides.

One of the knife guides is provided with a pair of grooves 20 on each opposite end for receiving a pair of springs 21. These springs are attached to this knife guide by pins 22 at the upper end of each of the grooves 20. At the end of each spring is a hook 23. On the other knife guide are eyes 24 for receiving the hooks when the parts are in the position shown in Fig. 1. In Fig. 6 the springs are simply hung on eyes 25 on the ends of the guides, and can be fastened at the bottom by engaging pins 26.

The operation will be obvious.

A loaf of bread is placed on the bread board and the knife guides are brought up to vertical position in which they are stopped by the loaf or by the surfaces 11. Then the hooks 23 are caught in the eyes 24 and the knife guides, which now form the side walls of the bread holding device, are resiliently connected so that they bear on the sides of the loaf of bread and hold it in position. From this construction it will be seen that variations in the size of the bread are provided for in such a way that the knife guides themselves hold the bread in position, and that if the cutting operation has to be stopped the bread cannot ordinarily get out of position before it is commenced again. Any kind of a bread knife can be used to cut the bread into slices and any inexperienced operator can use the device with just as much success as an experienced one. Moreover if the bread is new and soft, the sides of the loaf are so held by the guides that the bread is not crushed but is held in shape so that it is cleanly cut and in all cases the end slices are cut with as much accuracy as the middle, thus avoiding a prolific source of waste. When the operation is completed the hooks are detached from the eyes and the knife guides allowed to fall into horizontal position, in which they are held by the square corners 17ᵇ or by the flanges 12 on which they rest. This brings the parts to the position shown in Fig. 2 and obviously the bread can be removed as easily as from any ordinary bread board.

It will be understood, of course, that the object in making the plates 14 so readily removable is to permit the substitution of knife guides having different spaces between the slits. This permits the use of the device for making either thin or thick slices even when the guides are not provided with different widths of spaces.

While I have illustrated and described three preferred forms of the invention, I am aware that many other modifications can be made therein by any person skilled in the art without departing from the scope of the invention as expressed in the claims. Therefore I do not wish to be limited to all the details of construction herein shown and described, but What I do claim is:—

1. As an article of manufacture, a bread-board having vertical sides, and a pair of opposite knife guides therefor, each pivoted to the bread board at points beyond the vertical sides and below the top thereof in position to engage said vertical sides when the guides are in vertical position, whereby their inward motion is limited, and in position to engage the bread-board when swung down to horizontal position for the purpose of limiting their outer swinging motion.

2. As an article of manufacture, a bread-board having vertical sides and a pair of opposite knife guides therefor, each pivoted to the bread-board at points beyond the vertical sides and below the top thereof to swing oppositely outwardly and in position to engage said vertical sides when in vertical position, whereby their inward motion is limited, said guides each having a curved inner lower corner and a square outer lower corner, whereby when they are swung out the square corners will come into contact with said vertical sides of the board which will maintain them in horizontal position.

3. In a device of the character described, the combination of a bread board, a wire secured to each end thereof and projecting beyond both edges, and a knife guide pivoted to each end of the wire and adapted to swing from horizontal to vertical position, and having means thereon for limiting their downward motion to the horizontal.

4. As an article of manufacture, a bread-board having a pair of knife guides pivotally connected therewith at opposite sides thereof, and detachable resilient means at the top of said knife guides for holding them in vertical position.

5. In a device of the character described, the combination of a bread board, two knife guides pivoted to opposite edges thereof, springs attached to one of said guides at its opposite upper ends and having hooks on their ends and eyes on the other knife guide for receiving said hooks, whereby the knife guides are held yieldingly in vertical position.

6. In a device of the character described, the combination of a bread-board, a wire secured to the end thereof and projecting beyond the edges, said wire being resilient and capable of moving at its ends in a plane parallel to the top surface of the board, and a knife guide pivoted at its lower edge to the end of said wire by a pivotal connection capable of being disconnected by springing the end of the wire away from the knife guide, whereby said knife guide is rendered readily removable.

In testimony whereof I have hereunto set my hand, in the presence of two subscribing witnesses.

FRANK H. HAMBLIN.

Witnesses:
C. FORREST WESSON,
CATHARINE IMELDA HARTNETT.